3,427,161
PHOTOCHEMICAL INSOLUBILISATION
OF POLYMERS
Urbain Leopold Laridon and Gerard Albert Delzenne, Wilrijk-Antwerp, Belgium, assignors to Gevaert-Agfa N.V., Mortsel, Belgium, a Belgian company
No Drawing. Filed Feb. 25, 1966, Ser. No. 529,943
Claims priority, application Great Britain, Feb. 26, 1965, 8,480/65
U.S. Cl. 96—35.1
Int. Cl. G03c 1/68
17 Claims The present invention relates to a process for photochemically decreasing the solubility of soluble polymers, to the production of printing plates, and to printing plates obtained by this process.

It is known that by the addition to polymeric, light-sensitive systems of activating agents such as Michler's ketone, the insolubilisation rate of these polymeric, light-sensitive systems in the presence of actinic light rays is increased.

It has now been found that with certain polymeric, light-sensitive systems a synergistic activating effect may be obtained by using combinations of known activating agents.

The process for the production of an improved light-sensitive material according to the invention comprises homogeneously mixing together (A) a soluble, light-sensitive polymeric material taken from the group consisting of (i) polymers carrying side substituents possessing carbon-to-carbon unsaturation of the acryl or alkyl-acryl type, and (ii) polycondensation products of aliphatic or aromatic diols with aliphatic dicarboxylic acids possessing side chain unsaturation, and (B) a synergistic activating mixture consisting of two activating agents of which one is benzophenone, a p,p'-dialkylamino-benzophenone, or fluorenone and the other is a different activating agent taken from the group consisting of benzoin, benzoin methyl ether, anthraquinone, 2-methylanthraquinone, benzophenone, benzil, xanthone, 1,3,5-triacetylbenzene, fluorenone, fluorene, diacetyl, propiophenone and benzaldehyde.

Among the suitable p,p'-dialkylaminobenzophenone compounds can especially be mentioned p,p'-dimethylaminobenzophenone, generally known as Michler's ketone.

The light-sensitive, soluble, photochemically insolubilisable polymers, on which photochemical insolubilisation a mixture of benzophenone, p,p'-dialkylaminobenzophenone or fluorenone and at least one different compound as defined above has a synergistic activating influence, belong to different classes.

At first can be mentioned polymers carrying side substituents possessing carbon-to-carbon unsaturation of the acryl or alkylacryl type. These polymers can be obtained by reacting acrylic acid chloride or alkyl acrylic acid chloride with polymers carrying substituents, which are reactive with acid chloride radicals, especially hydroxyl groups and thiol groups.

The polymeric material carrying these reactive groups may be a natural polymer, a chemically modified natural polymer, a synthetic polymerisation product, a polycondensation product or a polyaddition product.

Among the natural polymers carrying hydroxyl groups may be mentioned cellulose, starch, dextrin and the like, and their partial esters and ethers as long as they still possess in their structure a substantial amount of free hydroxyl groups capable of reacting with acid chlorides, such as the hydroxyethyl and hydroxypropyl derivatives of cellulose and starch.

Synthetic polymerisation products that can be reacted with acrylic acid chloride or alkyl acrylic acid chloride according to the process of the invention are polyvinyl alcohol, partly acetalized or esterified polyvinyl alcohol, and copolymers comprising in their polymeric structure a substantial amount of vinyl alcohol groups. In this case the comonomer or comonomers may be chosen among styrene and its ring-substituted derivatives, vinyl chloride, vinylidene chloride, vinyl esters, vinyl ethers, acrylic and methacrylic acid esters, acrylonitrile, methacrylonitrile, butadiene, and the like. These comonomers are worked up in the synthetic polymerisation product in order to provide to the copolymers a maximum of strength and hardness after exposure to light and cross-linking.

In the same way a certain amount of plurally unsaturated monomeric groups may be present in the copolymer, such as divinylbenzene, diglycol diacrylates, N,N'-alkylene - bisacrylamides, N,N' - alkylene-bis-methacrylamides, N-allylacrylamide, N-methallylacrylamide, N,N'-diallylacrylamide, ethylene diacrylate and triallylcyanurate, provided that the photosensitive layer remains soluble when not affected by actinic light.

Synthetic condensation polymers carrying free hydroxyl groups are for instance polyamides carrying hydroxymethyl or hydroxyethyl substituents, and epoxy resins such as the polyether obtained by the polycondensation of 2,2-bis-(4-hydroxyphenyl)-propane with epichlorohydrin.

Polymeric materials containing thiolgroups are represented by thiolated gelatin, polythiolstyrene, polyvinylmercaptane, and the condensation product of poly(iso-phathalylidene-hexamethylene-diamine) and thioglycolic acid.

The polymers carrying side substituents possessing carbon-to-carbon unsaturation can also be obtained by reaction of polymeric materials having free hydroxyl substituents with N-methylolacrylamide or N-methylolalkyl acrylamide. In principle all the above mentioned natural polymers, synthetic polymerisation-, polycondensation-, and polyaddition products can be applied in this reaction.

Another group of light-sensitive, soluble, photochemically insolubilisable polymers is obtained by polycondensation of aliphatic or aromatic diols with aliphatic dicarboxylic acids possessing side chain unsaturation. Especially suitable as diols are the different glycols such as ethylene glycol, but also bisphenols such as 2,2-bis(4-hydroxyphenyl)-propane, its homologues and derivatives.

Suitable aliphatic dicarboxylic acids possessing side-chain unsaturation are for instance itaconic acid, $\alpha$-methyl-itaconic acid, $\gamma$-methyl-itaconic acid, $\gamma$-propyl-itaconic acid, $\gamma$-isopropyl-itaconic acid, $\alpha$-ethyl-itaconic acid, $\alpha,\gamma$-dimethyl-itaconic acid, teraconic acid, propylidene-succinic acid, methylene-glutaric acid, $\alpha$-ethylidene-glutaric acid, $\alpha$-ethylidene-adipic acid, ethylidene-malonic acid, propylidene-malonic acid, butylidene-malonic acid, isobutylidene-malonic acid, and the like.

In the polycondensation reaction between diols and aliphatic dicarboxylic acids possessing side-chain unsaturation a certain amount of other dicarboxylic acids can be present such as terephthalic acid, isophthalic acid, stilbene-dicarboxylic acids, benzophenone-dicarboxylic acids, diphenyldicarboxylic acids, and the like.

Another group of light-sensitive, soluble photo-chemically insolubilisable polymers is obtained by polycondensation of diamines with aliphatic dicarboxylic acids possessing side-chain unsaturation, whereby polyamides with side-chain unsaturation are obtained. The dicarboxylic acids used in these reactions are the same as those indicated above for the reaction with diols.

Insolubilisation of the polymeric material can be effected by subjecting it to actinic light rays. It could have been expected that the insolubilisation rate of the polymeric material would have been increased by the addition to benzophenone, p,p'-dialkylaminobenzophenone or fluorenone of another activating compound due to the greater total amount of activating agent present. In the most favourable case this increased insolubilisation could perhaps be equal to the sum of the activation rates of all activating agents. As a result it was very surprising that the insolubilisation rate of polymeric materials of the classes mentioned could be enhanced far above the sum of the activating actions of all activating compounds, by exposing to actinic light polymeric materials as defined in the presence of catalytic amounts of benzophenone, p,p'-dialkylaminobenzophenone or fluorenone and at least one different activating compound of the group consisting of benzoin, benzoin methyl ether, anthraquinone, 2-methyl-anthraquinone, benzophenone, benzil, xanthone, 1,3,5-triacetylbenzene, fluorenone, fluorene, diacetyl, propiophenone and benzaldehyde.

It was very surprising to find that the synergistic activating action due to the mixtures according to the invention could not be applied to all polymers possessing side-chain unsaturation. A mixture of Michler's ketone and benzoin, for instance, has no synergistic activating action upon the following polymers notwithstanding the fact that they all possess in their structure carbon-to-carbon side-chain unsaturation—the polymers obtained by reaction of the polyether of 2,2-bis(4-hydroxyphenyl)-propane and epichlorohydrin with:

(a) cinnamoyl chloride
(b) 6-coumarin-sulphonyl chloride
(c) styrene-$\beta$-sulphonyl chloride
(d) styrene-$\beta$-isocyanate
(e) monoethylfumaryl monochloride.

Another polymer on which a mixture of Michler's ketone and benzoin has no synergistic activating action although it contains unsaturated side-chains is copoly(vinyl methyl ether/monoallyl maleate).

The choice of mixtures of activating agents, which have a synergistic activating action on the polymers possessing side-chain unsaturation, is also to be restricted to those mixtures of activating agents that are especially described and claimed in this invention. Indeed, it is to be noted that on the polymers having side-chain unsaturation as defined mixtures of benzoin and one of the following known activating agents have no synergistic activating action: p-dimethylaminobenzophenone, p-diethylaminobenzaldehyde, 4H-quinolizin-4-one, 1,3-diphenyl-5-(p-iodophenyl)-2-pyrazoline, 1-methyl-2-benzoyl-methylene-naptho[1,2-d]-thiazoline, 3-cyclohexyl-5-[3-methyl-4,5-diphenyl-(4-oxazoline-2-ylidene)]-rhodanine or 1,3-diethyl-2-(3,3-dicyanoallylidene)-5-chloro-benzimidazole.

In the same way, when adding to Michler's ketone other known activating agents such as acetophenone, $\alpha$-acetonaphthone, diphenylene oxide, naphthalene, $\alpha$- and $\beta$-napthaldehyde, phenanthrene, pyrene or triphenylamine, no synergistic activating action is noticed on polymers possessing side-chain unsaturation according to the invention. This applies also to other combinations of known activating agents such as mixtures of xanthone with fluorene, benzil, propiophenone or 1,3,5-triacetylbenzene, or mixtures of 1,3,5-triacetyl-benzene with benzil or propiophenone.

The photosensitive mixtures of the invention may be exposed to actinic light from any source and of any type. The light source should preferably, although not necessarily, furnish an effective amount of ultraviolet radiation. Suitable sources of light include carbon arcs, mercury vapor lamps, fluorescent lamps, argon glow lamps, photographic flood lamps and tungsten lamps.

For initiating the photochemical insolubilisation a very strong light source is not needed. Indeed, in most of the examples described hereinafter, a 80 watt mercury vapor lamp, placed at a distance of about 15 cm. of the surface to be polymerised, is used. Brighter light sources are generally not needed since at these relatively low light intensities the photochemically insolubilisation rate according to the process of the invention is found to be strong enough.

In the photochemical insolubilisation of the polymeric materials high temperatures are not needed. The exposure, however, to strong light sources at a relatively short distance brings about a certain heating of the mass to be cross-linked, which heating exercises a favourable influence upon the cross-linking rate.

It has been found that the mixture of polymeric material and of activating compounds according to the invention is photosensitive, in the sense that its exposure to light causes its insolubilisation. Thus, if a layer of one of such initially soluble photosensitive mixture is applied to a support and exposed photographically the exposed areas become insoluble.

The invention is valuable in forming plates and films wholly made of the photosensitive mixture. The present process also makes possible the formation of coated printing films on any base by the deposition by any known process of films or coatings of the photosensitive mixture. Typical bases are metal sheets (e.g. copper, aluminum, zinc, etc.), glass, cellulose ester film, polyvinylacetal film, polystyrene film, polyethylene terephthalate film, etc.

The base or support is coated with a solution of the polymeric material in a suitable solvent, this solution containing dissolved or homogeneously dispersed therein a mixture of benzophenone, a p,p'-dialkylamiobenzophenone or fluorenone and one different of the other activating compounds as indicated, whereupon the solvent or solvent mixture is eliminated by known means such as evaporation, leaving a more or less thin coating of the photosensitive mixture upon the base or support. Thereafter the dried photosensitive coating is exposed to actinic light rays.

When the support material carrying the photosensitive composition is light-reflecting, there may be present, e.g. superposed on said support and adherent thereto or in the surface thereof, a layer or stratum absorptive of actinic light such as to minimize reflectance from the combined support of incident actinic light.

If the photosensitive composition is water-soluble, water may be used as a solvent for coating the support. On the contrary, if photosensitive compositions insoluble in water are used, organic solvents, mixtures of organic solvents, or mixtures of organic solvents and water may be employed.

The plates formed wholly of or coated with the photosensitive composition are useful in photography, photomechanical reproductions, lithography and intaglio printing. More specific examples of such uses are offset printing, silk screen printing, lithographic plates, relief plates, and gravure plates. The term "printing plates" as used in the claims is inclusive of all of these.

A specific application of the invention is illustrated by a typical preparation of a printing plate. In this application a plate, usually of metal, is coated with a film of the photosensitive composition. When the plate is not of metal, it may consist wholly of the photosensitive composition or it may be coated wtih a film thereof. In all these cases, the surface of the plate is exposed to light through a contacted process transparency, e.g. a process positive or negative (consisting solely of opaque and transparent areas and where the opaque areas are of the same optical density, the so-called line or half-tone negative or positive). The light induces the reaction, which insolubilises the areas of the surface beneath the transparent portions of the image, while the areas beneath the opaque portions of the image remain soluble. The soluble areas of the surface are then removed by a developer, and the remaining insoluble raised portions of the film can serve as a resist image, while the exposed base material is etched, forming a relief plate. As an alternative the plate can be inked and used as a relief printing plate directly in the customary manner.

After washing away the non-exposed and thus soluble parts of the layer or film, the polymer parts made insoluble by exposure to actinic light may be subjected, if desired, to other known hardening techniques. Of course, these hardening techniques will depend upon the kind of light-sensitive polymer used. When the original polymer is e.g. a polyether of 2,2-bis(4-hydroxyphenyl)-propane and epichlorohydrin, the insolubilised polymer part remaining after exposure and development can still be hardened supplementarily according to known techniques for epoxy resins.

The purpose of this additional hardening is to strengthen the insolubilised polymer parts as much as possible. If e.g. the remaining insolubilised polymer surface is to be used as a printing plate, a suchlike subsequent hardening often is desirable.

The thickness of the photosensitive layer is a direct function of the thickness desired in the relief image and this will depend on the subject being reproduced and particularly on the extent of the non-printing areas. In the case of half-tones the screen used is also a factor. Generally, the thickness of the photosensitive layer will vary from about 0.001 mm. to about 7 mm. Layers ranging from about 0.001 to about 0.70 mm. in thickness will be used for half-tone plates. Layers ranging from about 0.25 to about 1.50 mm. in thickness will be used for the majority of letterpress printing plates, including those wherein half-tone and line images are to be combined.

diluted with methylene chloride. The polymer is precipitated in methanol and separated. Yield: 1.4 g. of polymer containing recurring units of the formula:

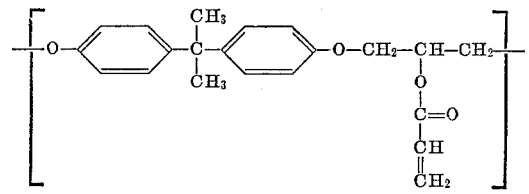

Of this substituted polyether amounts of 25 mg. are dissolved in as many amounts of 2 ccs. of methylene chloride mixed with 1 cc. of sym.-tetrachloroethane. To this series of solutions a determined amount of one or more activating agents is added as stated in the following Table 1. Then the obtained solutions are applied to aluminium sheets in such a way that after evaporation of the solvents a layer of 1µ is left. This layer is exposed through a halftone negative at a distance of 15 cm. The light source is a mercury vapor lamp of 80 watt, generating ultra-violet rays, or a common 300 watt lamp.

After this exposure, the layer is washed with a mixture of equal parts of methylene chloride and sym.-tetrachloroethane whereby the unexposed areas dissolve and are eliminated. The minimum time of exposure necessary in order to obtain a good relief image is given in Table 1.

TABLE 1

| | Amount of Michler's ketone, percent | Second activator | | Exposure time required | |
|---|---|---|---|---|---|
| | | Name | Amount used, percent | With U.V. light | With ordinary light |
| Test No.: | | | | | |
| 1 | 10 | | | 45" | 5'30" |
| 2 | | Benzoin | 10 | 5' | |
| 3 | 10 | do | 10 | 12"(25") | 1' |
| 4 | | Benzoin methyl ether | 10 | 3'45" | |
| 5 | 10 | do | 10 | 7"(15") | 1' |
| 6 | | Benzophenone | 10 | 7'30" | 5'30" |
| 7 | 10 | do | 10 | 10"(30") | 1'(2') |
| 8 | 10 | Benzil | 10 | 7"(15") | 1' |
| 9 | 10 | Anthraquinone | 10 | 15" | 1' |
| 10 | 10 | 2-methylanthraquinone | 10 | 20" | 1' |

The solvent liquid used for washing or "developing" the printing plates made from the photosensitive composition must be selected with care, since it should have good solvent action on the unexposed areas, yet have little action on the hardened image or upon the base material, the non-halation layer, or the anchor layer with which the photosensitive composition may be anchored to the support.

The photochemically insolubilisable compositions are suitable for other purposes in addition to the printing uses described above, e.g. as ornamental plaques or for producing ornamental effects; as patterns for automatic engraving machines, foundry molds, cutting and stamping dies, name stamps, relief maps for braille, as rapid cure coatings, e.g. on film base; as variable area sound tracks on film; in the preparation of printed circuits; and in the preparation of the other plastic articles.

The following examples illustrate the present invention.

EXAMPLE 1

In 20 ccs. of 1,1,2-trichloroethane are dissolved 0.02 g. of 2,6-di-tert.butyl-p-cresol and 1.42 g. (0.005 mol) of a polyether obtained by polycondensing 2,2-bis(4-hydroxyphenyl)-propane and epichlorohydrin. To this solution is added 1 cc. (0.012 mol) of acrylic acid chloride whereupon it is heated for 4 hrs. at 100° C. Then the reaction mixture is allowed to cool till room temperature and In the above table and also in the following tables the indicated percent of activator is calculated with respect to the amount of light-sensitive polymer present.

The columns "exposure time required" give in some cases also a second time between brackets. This time is obtained by noting the exposure time found for every activating agent separately and calculating the exposure time which could be expected by using together the two activating agents, which gives an increase of sensibility of the polymer due to the greater amount of activating agent present. When comparing the values between brackets with the real required exposure time, which in all cases is much shorter, the supersensitising effect resulting from the simultaneous presence of both activating agents is clearly illustrated.

EXAMPLE 2

The reaction of Example 1 is repeated but sym.-tetrachloroethane is used as solvent for the reaction of acrylic acid chloride with the polyether of 2,2-bis(4-hydroxyphenyl)propane and epichlorohydrin.

In order to examine the influence of different ratios of Michler's ketone to benzoin on the light-sensitivity of the polymer, a series of tests has been executed as that of Example 1. The minimum exposure time in order to obtain a good relief image is given in the following Table 2.

TABLE 2

| Test No.: | Michler's ketone, percent | Benzoin, percent | Exposure time required with U.V. light |
|---|---|---|---|
| 11 | 10 | ---- | 45'' |
| 12 | 10 | 10 | 13'' |
| 13 | 5 | ---- | 1' |
| 14 | 5 | 5 | 15'' |
| 15 | 5 | 7.5 | 12'' |
| 16 | 5 | 10 | 12'' |
| 17 | 2.5 | ---- | 1' |
| 18 | 2.5 | 0.5 | 1' |
| 19 | 2.5 | 1 | 45'' |
| 20 | 2.5 | 2.5 | 30'' |
| 21 | 2.5 | 4 | 30'' |
| 22 | 2.5 | 10 | 22.5'' |

EXAMPLE 3

In 10 ccs. of pyridine 2 g. are dissolved of a copoly-(vinyl acetate/vinyl alcohol) of low viscosity and which contains 40% of vinyl acetate groups. To the solution are added 0.02 g. of 2,6-di-tert.butyl-p-cresol and 5 ml. of methacrylic acid chloride, whereupon it is heated on an oil bath at 100° C. for 5 hrs.

After completion of the reaction the solution is diluted with 50 ml. of methanol, filtered and poured in water. The precipitated product is separated and dried under reduced pressure. Yield: 2.5 g. of a polymer built up by recurring units of the formula

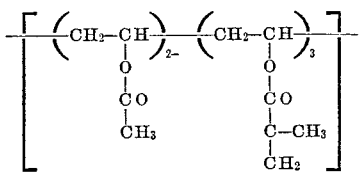

Of this substituted polymer amounts of 25 mg. are dissolved in as many amounts of 2 ccs. of methylene chloride mixed with 1 cc. of sym.-tetrachloroethane. To this series of solutions a determined amount of one or more activating agents is added as stated in Table 3. Then the obtained solutions are further treated as described in Example 1. The necessary exposure time in order to obtain a good relief image is also given in Table 3.

TABLE 3

| Test No.: | Amount of Michler's ketone, percent | Second activator Name | Second activator Amount used, percent | Exposure time required With U.V. light | Exposure time required With ordinary light |
|---|---|---|---|---|---|
| 23 | 10 | ---- | ---- | 90'' | 7'30'' |
| 24 | ---- | Benzoin | 10 | 11' | ---- |
| 25 | 10 | do | 10 | 30''(1') | 1' |

EXAMPLE 4

In 25 ccs. of pyridine are dissolved 0.02 g. of 2,6-di-tert.butyl-p-cresol and 1.72 g. of a copoly(vinyl acetate/vinyl alcohol) containing 60% of vinyl acetate groups. To this solution are added 3 ccs. of methacrylic anhydride and the whole is heated on an oil bath at 100° C. for 4 hrs. The reaction mixture is diluted with acetone and poured into water in order to precipitate the polymer. After drying, 1.5 g. of polymer is obtained consisting of recurring units of the formula:

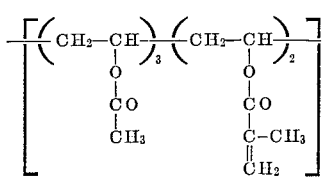

Of this modified copolymer two same solutions are prepared of 25 mg. in a mixture of 3 ccs. of methylene chloride and sym.-tetrachloroethane (2:1). To both solutions 2.5 mg. of Michler's ketone are added and to the second solution moreover 2.5 mg. of benzoin. Each of the obtained solutions is coated onto an aluminum foil in such a way that after evaporation of the solvent the remaining layer is about 1μ thick. Then the layers are exposed through a half-tone original placed at a distance of 15 cm. by means of a 80 watt mercury vapor lamp or a common 300 watt lamp. The non-exposed parts are washed away with methanol. In the following Table 4 the minimum exposure time is given in order to obtain a good relief image.

TABLE 4

| Test No.: | Amount of Michler's ketone, percent | Amount of benzoin, percent | Exposure time required With U.V. light | Exposure time required With ordinary light |
|---|---|---|---|---|
| 26 | 10 | ---- | 15'' | 3' |
| 27 | 10 | 10 | 1.5'' | 23'' |

EXAMPLE 5

In 10 ccs. of sym.-tetrachloroethane, which has been saturated with hydrogen chloride until pH 2, 15 ccs. are dissolved of a 10% solution of the polyether obtained by polycondensing 2,2-bis(4-hydroxyphenyl) - propane and epichlorohydrin in sym.-tetrachloroethane. To the obtained solution are added 1 g. of N-methylolacrylamide and 0.05 g. of 2,6-di-tert.butyl-p-cresol, and the whole is allowed to react for 3 hrs. on an oil bath at 40° C. The reaction mixture is diluted with 10 ccs. of methylene chloride, filtered and poured into methanol. The precipitated modified polymer is collected and dried under reduced pressure. Yield: 1.3 g. of polymer consisting of recurring units of the formula:

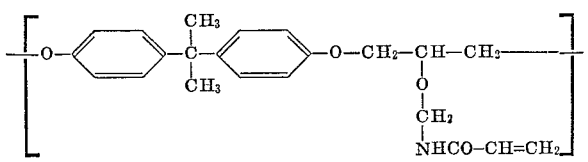

Of this substituted polyether three same solutions are prepared of 25 mg. in a mixture of 2 ccs. of methylene chloride and 1 cc. of sym.-tetrachloroethane. To the several solutions the amounts of activating agents are added as stated in Table 5. The solutions are then coated onto aluminium sheets in such a way that after evaporation of the solvents layers of about 1μ thickness are obtained. They are then exposed through a half-tone original placed at a distance of 15 cm. by means of a 80 watt lamp or with a common 300 watt lamp. The unexposed parts are washed away with a mixture of equal parts of methylene chloride and sym.-tetrachloroethane. The minimum exposure time in order to obtain a good relief image is given for each case in Table 5 hereinafter.

TABLE 5

| Test No.: | Amount Michler's ketone, percent | Amount of benzoin, percent | Exposure time required With U.V. light | Exposure time required With ordinary light |
|---|---|---|---|---|
| 28 | 10 | ---- | 30'' | 3'45'' |
| 29 | ---- | 10 | 3'45'' | ---- |
| 30 | 10 | 10 | 3''(5'') | 12'' |

EXAMPLE 6

In a flask are placed 0.15 mol of dimethyl terephthalate, 0.15 mol of dimethyl itaconate, 10 mg. of zinc acetate, 20 mg. of antimony(III) oxide and 0.6 mol of ethylene glycol. For the re-esterification reaction the mixture is first heated at 197° C. for 2 hrs. while a slow nitrogen current is bubbled through it. Thereafter the melt is stirred with a strong nitrogen current for ½ hr. Then the polycondensation reaction is carried out at 197° C., first for 2 hrs. under 4 mm. pressure of Hg and then for 1 hr. under 1 mm. pressure.

The obtained polycondensate consists of equal parts of recurring units of the formulae:

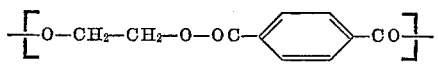

and

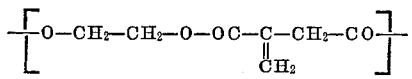

As described in Example 1 the polymer is dissolved in a mixture of methylene chloride and sym.-tetrachloroethane. To two equal parts of the obtained solution 1 or 2 activators are added. These parts are then separately applied to an aluminum sheet, whereupon the sheets are exposed to U.V. light behind a half-tone original. The minimum exposure time for obtaining a good relief image is given in Table 6 below.

TABLE 6

| Test No.: | Amount of Michler's ketone, percent | Amount of benzoin, percent | Exposure time required with U.V. light |
|---|---|---|---|
| 31 | 10 | | 30'' |
| 32 | 10 | 10 | 12'' |

EXAMPLE 7

In a flask equipped with a condenser and a calcium chloride tube are placed 2.84 g. of polyether of 2,2-bis(4-hydroxyphenyl)-propane and epichlorohydrin. After adding 2 ccs. of methacrylic acid chloride the mixture is heated at 100° C. on an oil bath for 4 hrs. Then the mixture is allowed to cool, diluted with methylene chloride, filtered and poured in methanol. The precipitated modified polyether is separated and dried under reduced pressure. Yield: 2.4 g. of polymer consisting of recurring units of the formula.

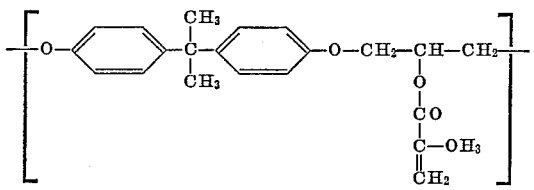

Of this substituted polyether three amounts of 25 mg. are dissolved in as many amounts of 2 ccs. of methylene chloride mixed with 1 cc. of sym.-tetrachloroethane. To this series of solutions a determined amount of one or more activating agents is added as stated in the following Table 7. In order to find the required exposure time for obtaining a good relief image, the procedure of Example 1 is followed.

TABLE 7

| Test No.: | Amount of Michler's ketone, percent | Amount of benzoin, percent | Exposure time required | |
|---|---|---|---|---|
| | | | With U.V. light | With ordinary light |
| 33 | 10 | | 45'' | 7'30'' |
| 34 | | 10 | 2'45'' | |
| 35 | 10 | 10 | 10'' | 30'' |

When in the above reaction methacrylic acid chloride is replaced by ethacrylic acid chloride, then in the polymer the methyl group in α-position of the acryl substituent is replaced by an ethyl group. The polymer thus modified can be subjected to the synergistic activating action as well as the polymer formed above.

EXAMPLE 8

5.68 g. of polyether of 2,2-bis(4-hydroxyphenyl)-propane and epichlorohydrin are dissolved in a flask containing 50 ccs. of sym.-tetrachloroethane. To this solution are added 0.03 g. of 2,6-di-tert.butyl-p-cresol, 1 g. of maleic anhydride and 2 ccs. of acrylic acid chloride. A condenser is placed on the flask and the latter is sealed with a calcium chloride tube, whereupon the reaction mixture is thoroughly mixed by stirring and heated at 110–120° C. on an oil-bath for 5 hrs. After cooling, the reaction mixture is diluted with methylene chloride and poured into methanol. The precipitated polymer is collected and dried under reduced pressure. Yield: 8 g. of polymer consisting of recurring units of the formulae:

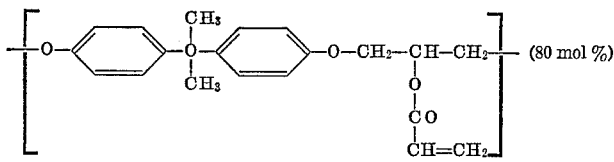 (80 mol %)

and

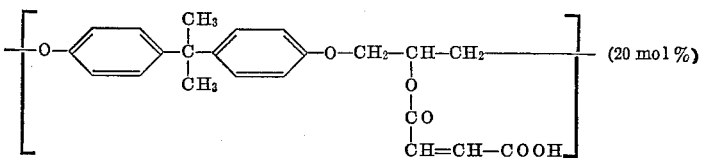 (20 mol %)

As described in Example 1, the polymer is dissolved in a mixture of methylene chloride and sym.-tetrachloroethane, admixed with one or more activating agents, coated as a layer onto an aluminium sheet, and exposed to U.V.- and ordinary light behind a half-tone original. The minimum time required for obtaining a good relief image is given in Table 8 below.

TABLE 8

| Test No.: | Amount of Michler's ketone, percent | Amount of benzoin, percent | Exposure time required | |
|---|---|---|---|---|
| | | | With U.V. light | With ordinary light |
| 36 | 10 | | 30'' | 3'15'' |
| 37 | | 10 | 11' | |
| 38 | 10 | 10 | 15''(30'') | 1' |

EXAMPLE 9

5.68 g. of polyether of 2,2-bis(4-hydroxyphenyl)-propane and epichlorohydrin are dissolved in 50 ccs. of sym.-tetrachloroethane. To this solution are added subsequently 0.03 g. of 2,6-di-tert.-butyl-p-cresol, 2 ccs. of acrylic acid chloride and 1.5 g. of phthalic anhydride. The reaction mixture is heated on an oil bath at 110°–120° C. for 5 hrs., then cooled, diluted with methylene chloride, filtered, and poured in methanol. The precipitated polymer is collected, and dried under reduced pressure. Yield: 9 g. of modified polyether having the formula:

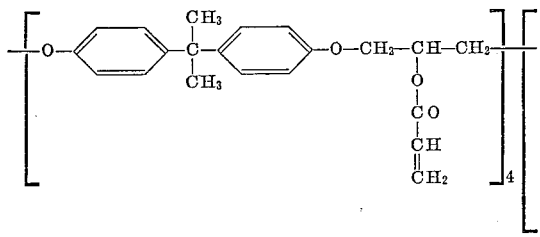

As described in Example 1 this polymer is dissolved in a mixture of methylene chloride and sym.-tetrachloroethane and admixed with one or more activating agents. The obtained mixture is coated onto aluminium sheets and exposed to U.V.- and ordinary light behind a halftone original. The minimum time required for obtaining a good relief image is given in Table 9 below.

TABLE 9

| Test No.: | Amount of Michler's ketone, percent | Amount of benzoin, percent | Exposure time required with ordinary light |
|---|---|---|---|
| 39 | 10 | | 2' |
| 40 | 10 | 10 | 15'' |

EXAMPLE 10

Amounts of 25 mg. of the substituted polyether, the preparation of which is described in Example 1, are dissolved in as many amounts of 2 ccs. of methylene chloride mixed with 1 cc. of sym.-tetrachloroethane.

To this series of solutions one or two activating agents are added as stated in the following Table 10. Each of these activating agents or pair thereof is added in an amount of 10% based on the amount of light-sensitive polymer present. The solutions obtained are applied to aluminium sheets in such a way that after evaporation of the solvents a layer of 1µ is left. This layer is exposed through a half-tone negative at a distance of 15 cm. The light source is an ultraviolet ray generating mercury vapor lamp of 80 watt. After exposure, the layer is washed with a mixture of equal parts of methylene chloride and sym.-tetrachloroethane, whereby the unexposed areas dissolve and are eliminated. The minimum time of exposure needed to obtain a good relief image is given in Table 10.

TABLE 10

| Test No. | First activating agent | Second activating agent | Exposure time required |
|---|---|---|---|
| 41 | Michler's ketone | | 45''. |
| 42 | do | Propiophenone | 15''(30''). |
| 43 | do | Xanthone | 5'. |
| 44 | Michler's ketone | do | 3''(7''). |
| 45 | do | 1,3,5-triacetylbenzene | 3''(30''). |
| 46 | do | Benzaldehyde | 12''(30''). |
| 47 | | Fluorenone | >15'. |
| 48 | Michler's ketone | do | 7''(22''). |
| 49 | do | Fluorene | 15''(30''). |
| 50 | do | Diacetyl | 15''(30''). |
| 51 | Benzil | | 11'. |
| 52 | do | Fluorenone | 60''(7''). |
| 53 | Benzophenone | | 5'. |
| 54 | do | Benzoin | 45''(2'). |
| 55 | do | Anthraquinone | 2'45''(7'). |
| 56 | do | Benzil | 1'30''(3'45''). |

What we claim is:

1. A process for the production of an improved light-sensitive material, which comprises homogeneously mixing together (A) a soluble, light-sensitive polymeric material taken from the group consisting of (i) polymers carrying side substituents possessing carbon-to-carbon unsaturation of the acryl or lower alkylacryl type, and (ii) polycondensation products of aliphatic or aromatic diols with aliphatic dicarboxylic acids possessing side-chain unsaturation, and (B) a synergistic activating mixture consisting of two activating agents of which one is benzophenone, p,p'-dialkylaminobenzopheone or fluorenone, and

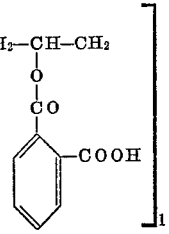

the other is a different activating agent taken from the group consisting of benzoin, benzoin methyl ether, anthraquinone, 2-methyl anthraquinone, benzophenone, benzil, xanthone, 1,3,5,-triacetylbenzene, fluorenone, fluorene, diacetyl, propiophenone and benzaldehyde.

2. A process as claimed in claim 1, wherein said soluble, light-sensitive polymeric material carrying side substituents possessing carbon-to-carbon unsaturation of the acryl or lower alkylacryl type is obtained by reacting acrylic acid chloride or lower alkylacrylic acid chloride with polymers carrying substituents that are reactive with acid chloride radicals.

3. A process claimed in claim 2, wherein said soluble, light-sensitive polymeric material carrying side substituents possessing carbon-to-carbon unsaturation of the acryl or lower alkylacryl type is obtained by reacting acrylic acid chloride or lower alkylacrylic acid chloride with the polyether from 2,2-bis(-hydroxyphenyl)-propane and epichlorohydrin.

4. A process as claimed in claim 1, wherein said synergistic activating mixture is a mixture of Michler's ketone and a member selected from the group consisting of 1,3,5-triacetylbenzene, fluorenone, benzophenone and benzoin.

5. A process as claimed in claim 1, wherein said synergistic activating mixture is a mixture of fluorenone and benzil.

6. A process as claimed in claim 1, wherein said synergistic activating mixture is a mixture of benzophenone and benzil.

7. A process as claimed in claim 2, wherein said soluble, light-sensitive polymeric material carrying side substituents possessing carbon-to-carbon unsaturation of the acryl or lower alkylacryl type is obtained by reacting acrylic acid chloride or lower alkylacrylic acid chloride with a copoly(vinyl acetate/vinyl alcohol).

8. A process as claimed in claim 1, wherein said soluble, light-sensitive polymeric material carrying side substituents possessing carbon-to-carbon unsaturation of the acryl or lower alkylacryl type is obtained by reacting N-methylolacrylamide or N-methylolloweralkylacrylamide with polymeric materials having free hydroxyl substituents.

9. A process as claimed in claim 8, wherein said soluble, light-sensitive polymeric material carrying side substituents possessing carbon-to-carbon unsaturation of the acryl or lower alkylacryl type is obtained by reacting N-methylolacrylamide or N-methylolloweralkylacrylamide with the polyether from 2,2-bis(4-hydroxyphenyl)-propane and epichlorohydrin.

10. Process as claimed in claim 1, wherein said soluble, light-sensitive, polymeric material carrying side substituents possessing carbon-to-carbon unsaturation of the acryl or lower alkylacryl type is a polycondensation product of an aliphatic or aromatic diol with an aliphatic dicarboxylic acid possessing side-chain unsaturation.

11. Process as claimed in claim 10, wherein said soluble light-sensitive, polymeric material carrying side substituents possessing carbon-to-carbon unsaturation of the acryl or lower alkylacryl type is obtained by the polycondensation of the ethylene glycol and itaconic acid.

12. Process as claimed in claim 10, wherein said soluble, light-sensitive, polymeric material is obtained by the polycondensation of ethylene glycol and a mixture of itaconic acid and terephthalic acid.

13. Light sensitive polymeric materials comprising the homogeneous mixture of (A) a soluble, light sensitive polymeric material taken from the group consisting of (i) polymers carrying side substituents possessing carbon-to-carbon unsaturation of the acryl or lower alkylacryl type, and (ii) polycondensation products of aliphatic or aromatic diols with aliphatic dicarboxylic acids possessing side-chain unsaturation, and (B) a synergistic activating mixture consisting of two activating agents of which one is benzophenone, p,p'-dialkylamino benzophenone or fluorenone, and the other is a different activating agent taken from the group consisting of benzoin, benzoin methyl ether, anthraquinone, 2-methyl anthraquinone, benzophenone, benzil, xanthone, 1,3,5-triacetylbenzene, fluorenone, fluorene, diacetyl, propiophenone and benzaldehyde.

14. Process for the photochemical insolubilisation of polymers, which comprises exposing to actinic light a light-sensitive polymeric material according to claim 13.

15. A recording process wherein a recording material consisting of or including a layer comprising a light-sensitive polymeric material according to claim 13 is exposed to a pattern of actinic light representing matter to be recorded, so that over the areas of said layer selective or differential insolubilisation takes place.

16. Process for producing a photographic resist image by the photochemical insolubilisation of a light-sensitive polymeric material according to claim 13, wherein a photographic element is exposed to actinic light through a process transparency, said photographic element comprising a support having thereon a layer of said light-sensitive polymeric material, whereby in the exposed areas said light-sensitive polymeric material is cross-linked to the insoluble state and the soluble polymeric material in the unexposed areas is removed, thereby forming a photographic resist image.

17. Process for producing a photographic printing plate by the photochemical insolubilisation of a light-sensitive polymeric material according to claim 13, wherein a photographic element is exposed to actinic light through a process transparency, said photographic element comprising a support having thereon a layer of said light-sensitive polymeric material, whereby in the exposed areas said light-sensitive polymeric material is cross-linked to the insoluble state and the soluble polymeric material in the unexposed areas is removed, thereby forming a photographic printing plate.

References Cited

UNITED STATES PATENTS

| 2,949,361 | 8/1960 | Agens | 96—35.1 X |
| 2,989,455 | 6/1961 | Neugebauer et al. | 204—159.23 |
| 3,326,710 | 6/1967 | Brodie | 204—159.23 X |

NORMAN G. TORCHIN, *Primary Examiner.*

R. E. MARTIN, *Assistant Examiner.*

U.S. Cl. X.R.

96—36.2, 36.3, 36.4, 38.1, 115; 204—159.23